United States Patent Office 3,597,220
Patented Aug. 3, 1971

3,597,220
CHILLPROOFING OF BEVERAGES USING INSOLUBLE BASIC POLYMER-ENZYME PRODUCT
Bernard W. Weinrich, St. Charles, John H. Johnson and Bernard S. Wildi, Kirkwood, and David C. Boyce, Webster Groves, Mo., assignors to Monsanto Company, St. Louis, Mo.
No Drawing. Filed Sept. 27, 1968, Ser. No. 763,369
Int. Cl. A23i 1/02; C12h 1/04
U.S. Cl. 99—48        35 Claims

ABSTRACT OF THE DISCLOSURE

Improved process for chillproofing of beverages, especially malt beverages, using insoluble basic polymer-enzyme products, whereby the activity-pH profile and substrate-binding character of normally inactive or non-optimally active enzymes can be optimized for performance at the pH range of the beverage. Permits removal of enzymatically-active agents, reuse and attendant economics, and also provides improved chillproofing stability, clarity, and taste in the beverage treated; beverages chillproofed in this manner.

FIELD OF INVENTION

Chillproofing of beverages; improved efficiency and product quality.

PRIOR ART

Chillproofing of beverages dates back to the early 1900's and in the case of beer is summarized in a series of patents (U.S. 995,820; 995,823–995,826) and in a paper presented at the Proc. 2nd Intl. Brewers Congress, Chicago, I, 294 (1911). These reported studies introduced the concept of enzyme treatment for clarification of beer. More recent reviews include: Wallerstein Lab. Communications 24, No. 84, 158–168, 232–242 (1961) with particular reference to page 160; "Some Physical and Chemical Properties of Commercial Chillproofing Compounds," H. E. Weissler and A. C. Garza, Ann. Proc. Am. Soc. Brewing Chemists 1965, pp. 225–238. Further related enzyme treatment is found in U.S. 3,055,757 (i.e., use of chitinase). The subject is further reviewed in sections of several books: "Enzymes in Food Processing," Gerald Reed, editor, Academic Press, New York (1966), pp. 339–344; "Handbook of Food Additives," Thomas E. Furia, editor, The Chemical Rubber Co., Cleveland, Ohio (1968), p. 87' and "Encyclopedia of Chemical Technology," Kirk-Othmer, 2nd ed., vol. III, pp. 297–338 (1965).

SUMMARY OF THE INVENTION

The invention relates to improved enzyme processing of fermented malt beverages and other non-distilled alcoholic beverages for purposes of providing a stabilized, enhanced appearance and improved flavor at the time of use. Current enzyme treatments leave active enzyme in the product which may have deleterious effects and which in any event present another active entity, namely, the enzyme, for intake into the human body. The present invention relates to utility of insoluble basic polymer-enzyme products in such an enzymatic treatment of beverages. It discloses new and improved beverages based on the ability to remove all enzyme activity prior to consumption of the beverage and it fosters process economies based on recoverability and reuseability of the enzyme-polymer products employed.

In view of the fact that enzymes have been used for such an extensive period in the chillproofing of beverages and, in general, left in the beverage up through packaging and until consumption of the beverage, and since tastes of consumers have become acclimated to the final taste sensations as produced by the brewing process including the presence of residual enzymes and the by-products and products of their reactions with components of the beverage up through packaging and until ultimate consumption, it is remarkable that the tastefullness of beverages chillproofed with the basic polymer-enzyme products of the invention but from which the insoluble polymer-enzyme product has been removed is not impaired. Quite to the contrary and entirely unpredictably, however, the taste of the ultimate beverage chillproofed according to the present invention is not impaired, but is rather found by the great majority of consumers to have an enhanced or improved flavor and certainly a flavor at least equal to that of a corresponding beverage chillproofed in conventional manner. Since the chillproofing agents of the invention are insoluble, they can be completely removed from the beverage, leaving the beverage free of enzymes which are non-indigenous to the beverage by its very nature. However, it is obvious that, in cases where producer or consumer demands require an enzyme of one type or another, e.g. pepsin, as a digestant or for some other reason, the introduction of such further ingredient into the beverage at any suitable stage of its production before packaging is a simple expedient.

OBJECTS

The objects of the instant invention include the provision of a process for the production of non-distilled alcoholic beverages which retain clarity upon chilling, even after periods of prolonged aging, while at the same time possessing improved characteristics including improved flavor, apparently resulting from removal of the polymer-enzyme treating agent from the product, and beverages produced in this manner. Other objects will become apparent hereinafter, and still other objects will be obvious to one skilled in the art.

GENERAL DESCRIPTION OF INVENTION

Fermented malt beverages such as beer and ale are today widely distributed in convenient individualized containers such as glass bottles and cans. Such containers, of course, are subject for varying lengths of time to a wide variety of temperature and other storage and shipping conditions that might adversely affect their contents. In addition, variable amounts of air, which appears to have a particularly deleterious effect on the stability of malt beverages, may enter the container during filling, thereby resulting in a reduction of the normal shelf-life of the beer and in the production of haze and turbidity.

It is, of course, necessary in order to obtain consumer acceptance, that the individual containers of malt beverage yield upon opening a product that is brilliant in visual appearance and pleasing in taste. Since the container prior to opening is commonly transported and stored for long periods of time at room temperature or higher, and then subjected to chilling conditions, it is necessary that the contents withstand such storage without change.

Fermented malt beverages such as beers, ales, and the like are produced by the fermentation with yeast of worts obtained from mashes of barley malt and grains. After fermentation, the beers so obtained are carried through various operations such as cold storage, carbonation, filtration, etc., in order to obtain the clear carbonated beverage ready for packaging. During the brewery operations, the beer is subjected to a process step known in the trade as chillproofing.

When beers are subjected to low temperatures, as occur, for example during conventional refrigeration and these beers have not been chillproofed, a haze or turbidity forms in the beer as a consequence of the presence of high molecular weight, protein-like compounds and protein-complexes involving carbohydrates, phenols, tannins, etc., that tend to become insoluble when the temperature is reduced. Chillproofing is a step in the brewing process that produced a beer which will remain clear and brillant at low temperatures. The chillproofing process was introduced to the art of brewing many years ago when the value of proteolytic enzymes for such use was first demonstrated.

Chillproofing comprises treating the beer or ale after fermentation with certain proteolytic enzymes. During the next phase, or pasteurization, the enzymatic activity is accelerated to prevent formation of haze-producing complexes. A residual enzymatic activity remains after pasteurization. The enzyme papain is commonly used for chillproofing. When it has successfully chillproofed millions of barrels of beer, it is not necessarily the best material for that purpose.

Deleterious factors, such as oxidation and the presence of traces of metals, may adversely affect the shelf-life of beer not only because of well-known reactions with beer constituents to produce unstable compounds causing hazes and sediments, but also because of inactivation by further reactions of the enzymes surviving the pasteurization process of the final package. The inactivation action or reaction of the oxygen and metals on or with the enzymes may not be direct but through an intermediate action on certain oxidizable components present in beer. These compounds may form complexes or chelates with the trace metals which readily become highly oxidized to form oxygen donors which then react in turn with the enzymes.

During the course of such oxidation, these complex systems may become insoluble and contribute to the formation of hazes and turbidities and moreover adversely affect desirable foaming characteristics.

In addition to contributing to the physical instability, residual enzymes may also adversely affect flavor stability by the same mechanism, since it is well-known that certain oxidation products possess highly undesirable flavor characteristics.

In the past, chillproofing enzymes (e.g., papain) have been added to the beer in the form of dry, comminuted solids alone or in admixture with other solid materials. (See U.S. Pats. 995,820; 995,823; 2,077,448 and 2,077,449). More recently, liquid forms of proteolytic enzymes, alleged to have certain advantages, have become available for such use. (See U.S. Pat. 3,095,358). All of the forms of proteolytic enzymes previously employed, and the procedures for their use in the chillproofing of beverages, have been attended by disadvantages of the type previously cited.

Other methods of chillproofing beer are known, such as the adsorption and removal by filtration of the chill-haze substances using materials such as bentonite, polyvinylpyrrolidone and nylon. Neither the proteolytic enzymes nor adsorption materials mentioned above are the most ideal chillproofing materials.

It has now been discovered that a heretofore unrecognized and highly advantageous chillproofing system resides in the employment of basic polymer-enzyme products in which selected enzymes are covalently bonded to certain basic, cationic or ampholytic polymeric organic molecules such as the EMA-type polymers as defined hereinafter. Such enzymes can be obtained from plants, animals, and microorganisms which include bacteria, yeasts, fungi and the like by using well-known fermentation methods such as those generally described in Kirk and Othmer, Encyclopedia of Chemical Technology 8, 173–204, and a great many of them are available commerically. As we have now found, advantages realized by attachment to polymers with a dominant basic or cationic character (which may include polyampholytes) include a lowering of pH for optimum performance from 0.5 to 2 units and enhanced binding of negatively-charged substrates. Since much colloidal matter in aqueous suspension is negatively charged, these products have unusual binding capacity for the components of beverages which subsequently can lead to haze formation. Such binding enhances enzymatic destruction of these components. Binding of such components is further enhanced by strong hydrogen and hydrophobic bonding potential introduced by these basic EMA-type polymers. This bonding is unusually efficacious, since certain undesirable components (e.g., tannins and/or proteins) may be removed by adsorption to the insoluble polymer-enzyme product and, in addition, an enhancement of enzymatic destruction of other components (e.g., other proteins) is achieved. Gradations of bonding strengths and selectivity of binding can be achieved by suitable selection of basic EMA-type polymers. In a number of cases, such bonding and enzymatic destruction is favored by attachment to a polyampholyte (i.e., a polymer containing both basic and acid groups, ionized or unionized) (all or in part).

The exact activity of the enzymes employed as starting material depends on the exact method of preparation and is not critical to the present invention providing only that the enzymatically active polymer-enzyme product produced therefrom has the desired enzymatic activity. Various analytical methods are available to determine the activity of enzymatically active material, for example, the protease activity of proteolytic enzymes can be determined by well-known casein digestion methods, such as the Kunitz test or the Anson variation thereof. According to this test, a protease catalyzes the hydrolysis of casein for a certain period of time and temperature and at a certain pH; the reaction is stopped by the addition of trichloroacetic acid, and the solution is filtered. The color of the filtrate is developed by a Folin phenol reagent, and the level of enzyme activity is measured spectrophotometrically in units of casein tyrosine per unit time. This method is more fully described in the Journal of General Physiology 30, 291 (1947) and in Methods of Enzymology 2, page 33, Academic Press, New York, 1955. Amylase activity is generally determined by the well-known dextrin test or the dinitrosalicylic acid method of Bernfeld. The chillproofing activity of an enzyme, e.g., papain, and its proteolytic activity are not necessarily identical properties and it may be that the two are not even closely related.

There are reports in the literature that certain substances have shown good chillproofing ability, yet exhibit only a very low order of proteolytic activity. The reverse may also be found to exist. Therefore, the true value of any preparation must be confirmed by actual beer clarity tests.

It has been found that heating bottled beer for successive time periods at 35° C. and then cooling to 0° C. for 24 hours constiutes a reproduceable test method. (Official Methods of Analysis. Assoc. of Official Agric. Chemists 1965, 144–153). Using untreated beer as control, the value of chillproofing material can be established with a fair degree of accuracy, even though the amount of turbidity produced in untreated beers may vary somewhat with the specific product under investigation, mainly due to variations in production procedures and raw materials employed by different breweries.

Since many beverages, including carbonated malt beverages, are acidic in pH (pH 4–6) and since the instant invention provides a downward shift of optimum pH values for enzyme activity, enzymes which can be converted to active insoluble products useful in terms of the defined invention include: papain, chymopapain, ficin, asclepain, bromelain, any of several fungal and bacterial proteases (e.g., B. subtilis neutral protease, Streptomyces griseus protease), chitinase, trypsin, and chymotrypsin. Such enzymes may be attached to polymers bearing basic groups such as amines or positive charges such as may be achieved by protonating such amines or converting them to quaternary salts. A shift of the activity pH optimum of the enzymes into the pH range of the beverage is thereby achieved and at the same time enzyme-substrate binding is enhanced. The specific choices of the polymer carrier depend upon the affinity of the polymer-enzyme complex for the substrate and upon the optimum pH for activity of the complex vs. the optimum pH for digestion of the substrate (i.e., the complex is tailored for optimization of the catalytic digestion process).

As previously indicated, the compositions of haze-forming complexes vary in their chemical nature. To prevent build-up of these complexes, a multiplicity of enzymatic activity is frequently useful. For example, proteases, carbohydrases, phenolic oxidases, and/or tannases can be useful either individually or more particularly in combinations; dependent upon the dominant compounds making up the haze.

A particularly effective source of mixed enzymes which can be used as starting material for the enzyme-polymer products which are used in the present invention is a mutated *Bacillus subtilis* organism. The process for producing this organism and enzymes therefrom is described in U.S. Pat. 3,031,380. A culture of this *Bacillus subtilis* (species AM) organism has been deposited with the United States Department of Agriculture, Agricultural Research Service, Northern Utilization Research and Development Division, 1815 North University Street, Peoria, Ill., 61604, and has been assigned No. NRRL B-3411. The enzymatically active material produced by this organism has been found to consist of two proteases, approximately 65–75% neutral protease (activity at a pH of 7.0–7.5) the activity of which against haze-forming substances is greatly enhanced by binding to basic or cation-containing polymers as defined herein, and about 25–35% alkaline protease (activity at a pH of 9 to 10). A significant amount of amylase is also present. There are generally about 700 thousand to about 1.2 million units of neutral protease activity per gram of isolated solids and about 250 thousand to about 400 thousand units of alkaline protease activity per gram as determined by Anson's variation of the Kunitz "Casein" method. There are generally about 300 thousand to 350 thousand units of amylase activity per gram as determined by the Bernfeld method. As pointed out in the cited patent, the relative proportions of protease to amylase will vary depending on the exact conditions of growth of the microorganism, but we have found that the neutral and alkaline protease and the amylase will always be produced, in at least some amounts, almost regardless of changes in the culture medium and other conditions of growth of the microorganism. The ratio of the activity of the alkaline protease to the activity of the neutral protease in the starting materials and in the basic polymer-enzyme product is preferably no greater than about 0.25 to 1.2 to one.

Another source of mixed enzymes which can be used as starting material in accord with the present invention is *B. subtilis* strain NRRL 644, *B. subtilis* strain NRRL 941, and *B. subtilis* strain IAM 1523 (Japanese Culture Collection). Still other *B. subtilis* microorganisms are available which produce protease, mixtures of proteases, or protease and amylase, at least to a limited if not optimum extent. The so-called *Streptomyces griseus* neutral protease has a broad pH activity range which is further improved by the downward shift achieved as heretofore described and may constitute one starting enzyme for incorporation into the polymer-enzyme products of the invention.

Still another source of mixed enzymes having utility in basic polymer-enzyme products for clarification of beverages in accordance with this invention is pancreatin obtained from various animal sources. These extracts contain broad enzymatic activities including protease and diastatic activity.

The exact form in which these insoluble basic polymer-enzyme products are employed is immaterial. The resins suitable for the practice of this invention may be in-solubilized prior to attachment or concurrently with attachment. Alternatively the enzyme-polymer product may be insolubilized subsequent to the attachment step. Such insolubilization permits removal at will of enzymatic activity so that the catalytic digestion can be run under controlled conditions of time and temperature. This enables one to better control the quality of the final beverage product and improves economics of treatment by permitting reuse. With relation to malt beverages, such as beer and ale, it also permits enzyme treatment in countries where foreign inclusions in the beverage are prohibited by law. Such a system effectively chillproofs beer in an efficient and superior manner. A distinct and very inportant advantage exists due to the highly insoluble nature of the system which makes it possible to utilize the chillproofing properties more than once.

The importance of this discovery becomes readily obvious when the economics of the present and the new method of chillproofing are compared. Currently the brewery adds a specified amount of standard chillproofing enzyme preparation to a known volume of beer, i.e., one pound of chillproofing preparation per 100 or 200 barrels of beer. The cost of this treatment ranges between 2–4¢ per barrel.

The insoluble polymer-enzyme product can be advantageously introduced into the brewing process at any of several stages. It can be added to the cooled wort, just prior to fermentation, in which case the objectionable precursors of haze are digested during the fermentation process. In this instance, it is advantageous to use a product crosslinked to a somewhat lesser degree so that, while it remains insoluble, it is nonetheless in a gelatinous form which remains in suspension in the beer during the process of removing the yeast which settles after fermentation. Thus the insoluble yeast is removed by decantation techniques while the enzymatic activity continues through the ruh and storage stages and up to the filtration step at which time the insoluble polymer-enzyme product is removed for reuse. The insoluble polymer-enzyme product may also be added at later stages (e.g., during fermentation or storage) in keeping with traditional manufacturing processes. A further exemplification of the subject invention involves the pumping of storage beer through a filter-type unit containing the insoluble polymer-enzyme product, this unit being maintained at a temperature consistent with the optimum activity-temperature of the specific polymer-enzyme product or products being used. The effluent beer is then cooled, bottled and, where desired, pasteurized in accordance with procedures known to the art. The invention is applicable to the various malt beverages including beers and ales and to other non-distilled alcoholic beverages including wines, syrups, cordials, liqueurs, fruit brandies, etc.

Process for preparing polymer-enzyme products

Polymer-enzyme derivatives can be prepared by reacting the crystalline or crude enzyme or mixture of enzymes with the polymer in solution, resulting in formation of a polymeric product in which the enzyme is covalently bound. Reaction of polymer with a plurality of enzymes can obviously be carried out stepwise, one enzyme at a time, with or without intermediate isolation, or with all enzymes at once. The latter procedure is preferred for reasons of time, convenience and economy. When an anhydride or carboxyl is present in the polymer, e.g., an EMA-type polymer, covalent bonding of the enzyme to the polymer may be effected directly through reaction or coupling with an anhydride group or with a carboxyl group using a carboxyl activating agent. The product is the same in both cases. The pH range for the reaction depends upon the enzyme employed and its stability range. It is usually about 5 to 9.5, preferably about 6 to 8, but adjustment must be made for individual cases. Isolation and purification is generally effected according to normal biochemical procedures. Since covalent bonding of the enzyme to the polymer is desired, the reaction is ordinarily carried out at low temperatures and at relatively neutral pH's, in water or dilute aqueous buffer as solvent.

When carried out in this manner, the results are production of the desired active polymer-enzyme derivative, but degree of activity imparted to the polymeric product is sometimes lower than desired, possibly due to partial inactivation of the enzyme during the process. Resort may frequently advantageously be had to employment of a mixed solvent system, using a solvent in which the enzyme is at least partially soluble, usually in an amount up to about 50% by volume. Dimethtylsulfoxide (DMSO) is especially suitable as solvent together with water or aqueous buffer solution in a mixed solvent system. Using such a mixed solvent system, the desired active polymer-enzyme product is ordinarily obtained in higher yields and conversions to desirably active product, and introduction of desirably high amounts of enzyme activity into the polymer molecule is generally less difficult.

The polymer in such reaction preferably contains carboxyl or anhydride linkages, especially where the enzyme contains an amino, hydroxyl (including phenolic hydroxyl), or sulfhydryl group not essential for its enzymatic activity. The polymer is preferably EMA or an EMA-type polymer, but it can be any of those types herein disclosed for coupling or reaction with an enzyme, and in any event it is adapted to effect covalent bonding with the enzyme to produce a polymer-enzyme product either directly or indirectly using an activating agent. Inasmuch as the enzymatic activity of the starting enzyme is desired to be retained in the final product, it is of course firstly necessary that bonding of the enzyme to the polymer be through a group which will not result in inactivation of an active site in the enzyme molecule. Among the various reactive groups of enzyme molecules may be mentioned, besides amino and sulfhydryl, also hydroxyl (including phenolic hydroxyl), carboxyl and imidazolyl. Such groups are present in free or unbound form in inactive portions of enzyme molecules, as in a lysine, cysteine, serine, threonine, histidine, or tyrosine moiety of an enzyme molecule, where the particular moiety in question is not considered essential for enzymatic activity. Therefore, attachment to the polymer molecule is through reaction of the polymer with such group so as to avoid inactivation of the enzyme during attachment to the polymer molecule. Generally the linkage is an amide, imide, ester, thioester, or disulfide group, such as formed by the carboxyl or anhydride with an amine or hydroxyl group in a non-essential moiety of the enzyme protein chain. Amides are conveniently formed by reacting pendant amino groups of the enzyme with carboxylic anhydride groups on the carrier polymer in water, in aqueous buffer media, or in mixed solvents. Amides, imides and esters are readily formed by activating carboxyl groups of the polymer, and reacting them with respective hydroxyl, amine or mercaptan groups on the other reactant. Such activation may be effected using various carbodiimides, carbodiimidazoles, Woodrad's or Sheehan's reagent, or the like, to form highly active intermediates capable of reacting with groups in the enzyme under mild conditions, the latter favoring retention of enzymatic activity.

The polymer selected for such reaction can therefore be said to be adapted to couple or react with the enzyme, either directly or indirectly through use of an activating agent, as already indicated, and in any event to effect covalent bonding with the enzyme. The attachment procedures employed are conducted by techniques adapted to include any requisite protection for the enzyme, which may include a reversible blocking of the enzymatically active site or sites, as for example in the case of papain, where mercuripapain or zinc papain may be employed as an intermediate for reaction with the polymer in order to effect greater yields upon attachment, the protecting atoms being removed subsequent to the attachment reaction.

Polymeric moiety-crosslinking-water-insolubility

In its broadest context, the polymer to which the enzyme is coupled for use according to one or more aspects of the invention contains carboxyl or anhydride linkages, especially where the enzyme contains an amino, hydroxyl, or sulfhydryl group not essential for its enzymatic activity. Where the enzyme contains a carboxyl group not essential for activity, the polymer can contain hydroxyl or amine groups for reaction herewith. The polymer may be a basic EMA or an EMA-type polymer, or be any of those types disclosed for coupling reactions with an enzyme, and in any event it is adapted to couple or react with the enzyme to effect covalent bonding and production of the desired enzyme-polymer product.

Since covalent bonding is desired, it is understood that the carrier polymer is tailored to contain at least one reactive site for each polymer molecule with which the enzyme can react, either directly or indirectly, to produce a covalent bond. According to the instant invention, this reactive site (or sites) is preferably a carboxyl or carboxylic anhydride group.

Among the polymers suitable for the practice of the instant invention, polymeric polyelectrolytes having units of the formula $$\left[ -Z-\underset{\underset{X}{\overset{\|}{C}}=O}{C}R_A-(CH_2)_q-\underset{\underset{Y}{\overset{\|}{C}}=O}{C}R_B- \right]_n$$

wherein: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene) of 1 to 18 carbon atoms, preferably a bivalent carbon chain of 1 to 4 carbon atoms inclusive which is a part of a unit containing 1 to 18 carbon atoms, inclusive, $q$ is zero or one, X and Y are selected from hydroxy, —O alkali metal, OR, —OH—$NH_3$, —OH—$R_3N$, —OH—$R_2NH$, —OH—$RNH_2$, —NRR′, —$(Q)_p$—W—$(NR′R′)_x$, and —$(Q)_p$—W—$(—OH)_x$, wherein $x$ is 1 to 4 and $p$ is zero or one, wherein R is selected from the group consisting of alkyl, phenylalkyl, or phenyl, in each case of 1 to 18 carbon atoms, wherein R′ is H or R, wherein Q is oxygen or —NR′—, and wherein W is a bivalent radical preferably selected from lower-alkylene, phenyl, phenylalkyl, phenylalkylphenyl, and alkylphenylalkyl having up to 20 carbon atoms, X and Y taken together can be an oxygen atom, and at least one of X and Y being hydroxyl or X and Y together constituting an oxygen atom, are preferred. Many of these polymers are commercially available and others are simple derivatives of commercially available products, which can be readily prepared either prior to or simultaneously with the enzyme coupling reaction, or produced as a minor modification of the basic polymer after coupling. Such polymers containing the above-described EMA-type units are hereinafter referred to as an "EMA-type polymer." It is understood that, according to and for the purposes of the present invention, in order to achieve the desired basic or cationic character surrounding the attached enzyme, a substantial number (e.g., about 30–95%) of these polymer units include free amine, protonated amine or quaternary ammonium groups. It is necessary that at least one and preferably several (about 5–70%) of the units be adapted for enzyme attachment by any of several methods described herein or in literature encompassing a covalent bonding to the enzyme.

Alternatively, the cationic character can be provided through incorporation of monomers which impart a basic or cationic character such as C-vinyl pyridines, vinyl amine, the several amino-substituted vinyl benzenes (or toluenes, etc.), amine-bearing acrylates (or methacrylates, etc.), vinyl imidazole, etc.

Thus, in any event, the polymer after enzyme attachment and crosslinking, will have residual active or reactive groups which may be of various types, but these residual active or reactive groups, or residual "reactive sites" in the polymer will in one way or another comprise a certain percentage which are of a basic or cationic nature, so as to impart the requisite basic or cationic nature to the polymer-enzyme product for purposes of both optimum pH activity and maximum substrate binding in the beverage. At least about 30%, usually 30–100%, and preferably about 40–100% of these residual reactive sites should be of a basic or cationic nature for best results in chillproofing according to the present invention.

Since enzyme molecules commonly have an extremely high molecular weight, even if the polymeric units exemplified as usable for attachment of the enzyme occurs only once in a polymer chain, for example, once in every several hundred units, reaction of the enzyme with this unit will result in an enzyme-polymer product having substantial enzymatic activity and one wherein the enzyme moiety constitutes a substantial portion of the molecular weight of the polymeric enzyme product. If more than one of the exemplified units is present, multiple attachments can be achieved with increased enzymatic activity of the product. As pointed out hereinafter, preferably the units of the formula given are recurring, $n$ being at least 8. When the units are recurring, the symbols in the various recurring units do not necessarily stand for the same thing in all of the recurring units. Moreover, where the units are recurring, some of the X and Y groups may have meanings besides hydroxy or oxygen. For example, some, but not all, of them may be present in the form of imide groups, that is, groups in which X and Y together are —NR— or —N—W—$(NR'R')_x$ wherein R, W and R' have the values previously assigned.

A preferred type of polymeric material useful in the practice of the invention is the polymer of an olefinically unsaturated polycarboxylic acid or derivative with itself or in approximately equimolar proportions with at least one other monomer copolymerizable therewith. The polycarboxylic acid derivative can be of the non-vicinal type, including acrylic acid, acrylic anhydride, methacrylic acid, crotonic acid or their respective derivatives, including partial salts, amides and esters or of the vicinal type, including maleic, itaconic, citraconic, α,α-dimethyl maleic, α-butyl maleic, α-phenyl maleic, fumaric, aconitic, α-chloromaleic, α-bromomaleic, α-cyanomaleic acids including their partial salts, amides and esters. Anhydrides of any of the foregoing acids are advantageously employed.

Co-monomers suitable for use with the above functional monomers include α-olefins such as ethylene, propylene, isobutylene, 1- or 2-butene, 1-hexene, 1-octene, 1-decene, 1-dodecene, 1-octadecene, and other vinyl monomers such as styrene, α-methyl styrene, vinyl toluene, vinyl acetate, vinyl chloride, vinyl formate, vinyl propionate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer with dibasic acid derivatives. The polybasic acid derivatives can be copolymers with a plurality of co-monomers, in which case the total amount of the co-monomers will preferably be about equimolar with respect to the polybasic acid derivatives. Although these copolymers can be prepared by direct polymerization of the various monomers, frequently they are more easily prepared by an afterreaction modification of an existing copolymer. In any event, major modifications of polymer are made when necessary to ensure surrounding the enzyme with a basic or cationic atmosphere.

Copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines, or ammonia, either prior to, during, or subsequent to enzyme attachment. Other suitable derivatives of the above polymers include the partial alkyl or other esters and partial amides, alkyl amides, dialkyl amides, phenylalkyl amides or phenyl amides prepared by reacting carboxyl groups on the polymer chain with the selected amines or alkyl or phenylalkyl alcohol as well as amino esters, amino amides, hydroxy amides and hydroxy esters, wherein the functional groups are separated by loweralkylene, phenyl, phenylalkyl, phenylalkylphenyl, or alkylphenylalkyl, which are prepared in the same manner in each case with due consideration for preservation of enzyme attachment sites as previously stated. Other aryl groups may be present in place of phenyl groups. In the formation of basic or cationic units, particularly useful derivatives are those in which negatively-charged carboxyl groups are partially replaced with amine or amine salt groups. These are formed by reaction of said carboxyls with polyamines such as dimethylaminopropylamine or dialkylaminoalcohols such as dimethylaminoethanol, the former forming an amide linkage with the polymer and the latter an ester linkage. Suitable selection of the above derivatives permit control of several parameters of performance for the enzyme-polymer product of the invention.

Representative dibasic acid or anhydride-olefin polymers, especially maleic acid or anhydride-olefin polymers, of the foregoing type (EMA-type) are known, for example, from U.S. Pats. 2,378,629, 2,396,785, 3,157,595 and 3,340,680. Generally, the copolymers are prepared by reacting ethylene or other unsaturated monomer or mixtures thereof, as previously described, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, di-tertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 10,000, preferably about 100 to 5,000, and a molecular weight of about 1,000 to 1,000,000, preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. The product is obtained in solid form and is recovered by filtration, centrifugation or the like. Removal of any residual or adherent solvent can be effected by evaporation using moderate heating. Numerous of these polymers are commercially available. Particularly valuable copolymers are those derived from ethylene and maleic anhydride in approximately equimolar proportions. The product is commercially available.

The maleic anhydride copolymers thus obtained have repeating anhydride linkages in the molecule, which are readily hydrolyzed by water to yield the acid form of the copolymer, rate of hydrolysis being proportional to temperature. In view of the fact that the attachment reactions are carried out in aqueous solutions or suspensions, or using water-solvent mixtures, the product of the covalent bonding of the enzyme to EMA has carboxyl or carboxylate groups attached to its chains adjacent the enzyme instead of anhydride groups, due to hydrolysis of the anhydride groups which do not react with the enzymes during the reaction. The same is true of non-reacting anhydride groups present in other polymers, such as EMA-type polymers, which hydrolyze to carboxyl or carboxylate groups during the reaction. These maleic anhydride copolymers are converted to provide a substantially basic or cationic atmosphere, either prior to or subsequent to enzyme attachment.

The term "water-insoluble," as already stated, when applied means that the product concerned does not dissolve in water or aqueous solutions, even though it may have such characteristics as a high degree of swelling due to solvation by water, even to the extent of existence in a gel form. "Water-insoluble" products can be separated by methods including filtration, centrifugation, or sedimentation. Such characteristics are imparted by crosslinking.

Thus, water-insoluble products, according to the invention, are produced by reacting the enzyme with a water-insoluble polymer or by causing the reaction product of the enzyme-polymer or at least partially inactivated enzyme-polymer to become insoluble either by reaction with a polyfunctional crosslinking agent, such as a polyamine or polyol (including glycol), when this is necessary. The reaction product of the enzyme-polymer or at least partially inactivated enzyme-polymer product is often insoluble per se because of interaction between the enzyme moiety and additional polymer chains. If the polymer is pre-crosslinked so as to have a three-dimensional structure or, in some cases, has a sufficiently long linear chain length, the starting polymer is already water-insoluble. Other methods of crosslinking exist and are well known in the art. Further detailed description follows.

Insolubilization via crosslinking can be introduced at any of three stages in the preparation of products of this invention:

(1) The carrier polymer may be crosslinked prior to attachment of the enzyme by any of several procedures well known in the art of polymer reactions (e.g., incorporation of multifunctional unsaturated monomers during preparation of the polymer or subsequent reaction of the polymer with a few mole percent of multifunctional amines, glycols, etc.).

(2) Multifunctional amines, glycols, etc., can be added concurrently with the enzyme in the enzyme-attachment or coupling step.

(3) A multifunctional crosslinking agent may be added to the product after the enzyme has been attached. Such crosslinking agents are added in controllable amounts sufficient to insolubilize the product.

In addition, the enzyme reactant to be attached or coupled to the polymer is commonly multifunctional in itself and thus contributes to the three-dimensional network character of the product. In fact, in many cases, the insolubilization effected in this manner alone is sufficient to impart insoluble characteristics to the product without use of additional cross-linking agents.

When markedly insoluble products are the objective, it is often advantageous to employ copolymers which already contain some crosslinking. Such crosslinked copolymers are known and are obtainable by conducting the polymerization, e.g., the copolymerization of maleic anhydride and hydrocarbon olefin, in the presence of a crosslinking agent, e.g., a compound containing two olefinic double bonds, such as divinylbenzene or vinylcrotonate, poly-1,2-butadiene or alpha, omega-diolefins. The quantity of crosslinking agent will vary with the degree of insolubility desired, but generally will be on the order of from 0.1% to 10% by weight of the total monomer mixture.

As one example of procedure for preparation of the three-dimension polymer network, where necessary or desirable, a difunctional compound can be used for crosslinking a preformed dibasic acid/$C_2$–$C_{18}$ monoolefin copolymer. This can be achieved by reaction between the copolymer and a polyamine, e.g., from 0.1 to 10 mole percent of ethylenediamine. Thus, the quantity of crosslinking of the overall polymer can be controlled. It is understood that ethylenediamine is a typical example of a crosslinking reagent, but many other compounds, such as the group of alkylene and other similar polyamines, can be used for this purpose.

Preferred polymers are selected from the group consisting of (a) ethylene/maleic anhydride copolymer,
styrene/maleic anhydride copolymer,
vinyl methyl ether/maleic anhydride copolymer,
vinylacetate/maleic anhydride copolymer,
divinyl-ether/maleic anhydride cyclocopolymer,
polymaleic anhydride and polyacrylic anhydride, in each case with the prescribed basic or cationic character due to the basic or cationic groups therein, and preferred enzymes are selected from the group consisting of (b) papain (including zinc papain), neutral protease,
acid protease with optimum pH values in the upper acid pH range (i.e., 4.5–7.0), and ficin, and combinations thereof. Such combinations of two or more enzyme-polymer products produce results superior to those obtained when only a single enzyme-polymer product is employed and accordingly represent one preferred embodiment of the process. Use of combinations of a plurality of enzymes in the form of a single polymer-plural enzyme molecule is also contemplated by the present invention and represents another preferred embodiment thereof, inasmuch as a multiplicity of enzymatic activities can in this manner be imparted to the beverage at once, in the form of a stable product which is not subject to autolysis as are combinations or mere mixtures of enzymes. For example, a polymer-enzyme product containing a protease and an amylase or diastase, or containing pepsin and papain, has been found especially suitable for use according to the invention and such use represents an especially preferred embodiment of the invention. Although enzymes other than those named in the foregoing may certainly be present in the molecule of the polymer-enzyme product employed, such as an alkaline protease, the acidic nature of the beer makes it doubtful that any polymer-enzyme product which is not effective in the acidic ranges of about 3–6, usually 4–5, will effectively enter into or at least play a significant role in the chillproofing and haze elimination reactions.

Products of this invention are particularly useful when employed in filtering devices designed to promote maximum contact consistent with practical throughput. Such devices are preferably maintained at temperatures affording optimum enzymatic activity with heat exchangers serving to heat and cool the beverage prior to and after treatment. Alternately the insoluble enzyme products are admixed with batches of beverage such as as during latter stages of fermentation of beer or during low temperature storage and/or pasteurization. In the first case the enzyme-products are removed during rough filtration while in the latter instance they are removed in a final filtration prior to bottling. A subsequent pasteurization in the capped bottles may also be advantageous. A substantial amount of the original enzymatic activity remains in the residue on the filter and this can be introduced into the next batch when batch processing is employed.

DESCRIPTION OF THE PREFERRED EMBODIMENTS

The following preparations and examples are given by way of illustration only, and are not to be construed as limiting.

EXPERIMENTAL

Preparation of polymer-enzyme products

The general procedure employed consisted of allowing cold solutions of enzymes in appropriate buffers to react overnight at 4° C. with cold, homogenized polymer, e.g., base-containing EMA, suspensions. Basic or cationic derivatives of EMA–21 were preferably employed, which had a molecular weight of ca. 20–30,000. Other molecular weight polymers may also be used. For example, such derivatives of EMA–11, having a molecular weight of about 2–3,000, and EMA–31, having a molecular weight of about 60,000, may also be employed. Separation of soluble and insoluble adducts, after reaction, was achieved by centrifugation in the cold (Sorval SS–3 (TM) centrifuge, ca. 10,000 r.p.m. and 10 min. centrifugation time). Insoluble adducts were washed (and centrifuged), usually ten times with cold buffer and five times with cold distilled water and then lyophilized. Addition of a small amount of a crosslinker, e.g., hexamethylenediamine, in 1 to 2% concentration by weight, based upon the amount of polymer employed, to the reaction mixtures increases yields of desired insoluble product.

The reaction of the polymer with a plurality of enzymes, as in some of the preparations, can obviously be carried out stepwise, one enzyme at a time, with or without intermediate isolation, or with all enzymes at once. The latter procedure is preferred for reasons of time, convenience and economy.

PREPARATION 1

Partial dimethylaminopropylamine imide of EMA

A copolymer of ethylene and maleic anhydride, EMA–21 (30 g.) was suspended in xylene (500 ml.). The mixture was heated to reflux temperature under a nitrogen atmosphere. Dimethylaminopropylamine (14.58 g.) was added and the mixture held at reflux for 4.5 hours. Water, a biproduct of imide formation, was separated in a Dean-Stark trap and reaction was judged complete when water was no longer being evolved. The product was precipitated by addition of hexane and dried in a vacuum oven at 105° C. It contained 8.86% N indicating an imide content of 54.3%.

PREPARATION 2

Partial dimethylaminopropylamine imide of styrene/maleic anhydride copolymer (pre-cross-linked)

A crosslinked copolymer of styrene and maleic anhydride (prepared using 2% divinyl benzene as a crosslinking agent) was converted to a partial basic imide derivative as follows. The copolymer (30 g.) was suspended in xylene (500 ml.) and the mixture refluxed under nitrogen for 1 hour in apparatus fitted with a Dean-Stark trap for collecting any water present or evolved. The mixture was then cooled and dimethylaminopropylamine (12.12 g.) added. The mixture was refluxed until no further water was collected (2.1 ml. was evolved; theory 2.12 ml.). The product was isolated by pouring the cooled solution into 2 liters of hexane, followed by filtration and a wash with 2 liters or hexane. The yield was 37.5 g. or 93.6% of theory. The product contained 8.12% N, indicating an imide content of 77.5%.

PREPARATION

Partial diethylaminopropylamine imide of styrene/maleic anhydride copolymer A non-crosslinked (i.e., soluble) copolymer of styrene and maleic anhydride was converted to the 50% half-imide derivative by reaction with diethylaminopropylamine substantially as described in Preparation 2. A theoretical amount of water was evolved and collected from the reaction and the product yield was 95.2%. Nitrogen analysis indicated that the product was characterized by conversion of 49.9% of the anhydride groups originally present to the diethylaminopropylamine imide. This polymer exhibits a substantially basic character which in combination with the potential carboxyl groups on the polymer chain results in characterizing it as a polyampholyte.

PREPARATION 4

Partial dimethylaminopropylamine amide-acid of a copolymer of isobutylene and maleic-anhydride Isobutylene/maleic anhydride copolymer (20 g.) was dissolved in dimethylsulfoxide (500 ml.) and glacial acetic acid (200 ml.) was added slowly to prevent precipitation of the polymer. Dimethylaminopropylamine (6.62 g.) was added over a period of 0.5 hour with stirring and the mixture was allowed to stand overnight. The product was precipitated by pouring the product solution into ten volumes of acetone. It was filtered and washed several times with acetone by decantation. The product was a pure white solid having substantially half of the original anhydride groups remaining intact, with the remainder converted to the amide-acid form with basic character imparted by the pendant dimethylamino groups which were present as the acetate salt. The salt was readily dissociated by addition of base and the product was found to have an isoelectric point at about pH 4.8.

PREPARATION 5

Partial dimethylaminopropyl half-ester of a copolymer of 2-methyl pentene-1 and maleic anhydride Copolymer of 2-methylpentene-1 and maleic anhydride (25 g.) is suspended in toluene (1 liter.) and dimethylaminopropanol (11.3 g.) is added together with p-toluenesulfonic acid (0.1 g.) as catalyst. The mixture is heated to reflux with stirring for 8 hours. The polymer derivative is isolated by precipitation in hexane (5 liters) and is dried in a vacuum oven at 50° C. until constant weight is achieved. The recovered product is characterized by conversion of 77% of the original anhydride groups into the half-dimethylaminopropyl ester (based on nitrogen analysis).

PREPARATION 6

Water insoluble basic EMA-papain

A solution of 0.5 gram of crystalline papain is suspended in 55 ml. of 0.05 M acetate buffer, pH 4.5, until a clear solution is obtained. The papain solution is added with stirring to a cold (0–5° C.) homogenized suspension of 2.5 g. of basic EMA copolymer prepared in Preparation 1 in 250 ml. of 0.1 M phosphate buffer at a pH of 7.6. Hexamethylenediamine (1.25 g.) is added to crosslink the polymer-enzyme complex as it is formed. The reaction mixture is stirred overnight at 4° C. The insoluble basic EMA-papain derivative is separated by centrifugation and washed thoroughly with 0.1 M phosphate buffer, pH 7.5, and 0.1 M NaCl until the washings are free from enzymatic activity. Finally the product is washed with water to remove the salt and the product is lyophilized to yield 3.4 g. of EMA-papain, retaining 62% of the esterease activity found in the initial crystalline papain.

PREPARATION 7

Water insoluble basic EMA-Zn papain

Crystalline papain (0.1 g.) is dissolved in 60 ml. of a solution containing 0.005 M cysteine and 0.002 M EDTA at a pH of 6, this solution being aged at 37° C. for 15 min. prior to addition of papain. Zinc chloride (0.125 g.) is dissolved in 10 ml. of 0.005 M tris[tris(hydroxymethyl)aminomethane] buffer at pH 8.0 and added to the papain solution. Excess zinc and chloride ions are then removed by exhaustive dialysis against 0.005 M tris buffer and then against 0.005 M phosphate buffer. This product is used without isolation to attach it to EMA-21. Lyophilization of an aliquot indicates a yield of Zn-papain of 77%.

The basic EMA-Zn-papain is prepared by chilling a volume of the Zn-papain suspension containing 12 mg. of the zinc salt to 0° C. and adding 60 mg. of the basic EMA of Preparation 1 (dissolved in 5 ml. of dimethylsulfoxide) to the chilled Zn-papain with vigorous stirring. The crosslinking agent (1 ml. of a 1% hexamethylenediamine aqueous solution) is then added and the mixture stirred overnight at 4° C. The insoluble basic EMA-Zn papain is recovered by centrifugation followed by washing with water.

Prior to use in chillproofing of beverages, the Zn can be removed by treating a suspension with a solution containing cysteine and ethylenediamine tetraacetic acid (EDTA). The product upon removal of the Zn possesses 72% of its initial esterease activity. The insoluble basic EMA-Zn papain can be used in treating beverages without removal of the Zn with a somewhat lower activity, possibly aided by partial removal of Zn by components of the beverage.

PREPARTION 8

Insoluble basic EMA *B. subtilis* neutral protease

Insoluble basic EMA-neutral protease (as isolated from *B. subtilis* strain AM) is prepared in a manner substantially the same as described in Preparations 6 and 7 using the basic EMA from Preparation 1. Optimum activity for the insoluble enzyme product is found at 1–2 pH units lower than that for the pure neutral protease. The product contains 40% of the original neutral protease activity.

PREPARATION 9

Insoluble basic EMA-neutral protease/papain

A 50:50 mixture (by weight) of neutral protease (isolated from *B. Subtilis,* strain AM) and papain is attached to basic EMA-21 (Preparation 2) in a manner substantially that described in Preparation 6, resulting in the covalent binding of both enzymes to the insoluble basic polymeric network. The product contains 49% of the original papain activity and 36% of the original neutral protease activity.

PREPARATION 10

Insoluble basic SMA-neutral and alkaline protease and amylease product

A crude *B. subtilis* AM enzyme mixture containing the specified enzymes (0.8 g.) is suspended in cold distilled water (60 ml.) and stirred magnetically for one hour at 4° C. The resulting mixture is then centrifuged at 8,000 r.p.m. for ten minutes to remove any suspended and inactive solids. The supernatant is separated and made 0.065 M in calcium ion by the addition of 1 M Ca(OAc) and the solution is then stirred for thirty minutes in the cold (4° C.). The mixture is then centrifuged at 8,000 r.p.m. for ten minutes to remove precipitated and inactive solids. To the clarified supernatant there is added, with stirring, cold 0.05 M Veronal buffer, pH 7.8. While the above solutions are being prepared, SMA (0.1 g.) (*B. subtilis* enzymes: basic SMA (Preparation 2) 8:1 w./w.) is dissolved in dimethylsulfoxide (10 ml.). This solution is added dropwise to the stirred, cold enzyme solution (vide supra) and the mixture is then stirred overnight at 4° C. The mixture is centrifuged at 8,000 r.p.m. for ten minutes and the solid product is collected. The solid adduct is washed using twice its volume of cold, distilled water, with stirring and centrifugation. The adducts are washed in this manner fifteen times and the product then isolated by lyophilization. The enzymatic activities of the mixed enzyme product are as follows: Amylase 415,000 u./g.; neutral protease 1,093,000 u./g.; alkaline protease 685,000 u./g.

In another preparation in accord with the foregoing basic SMA (Preparation 3) is used and a crosslinking agent (2 ml. of 1% hexamethylenediamine aqueous solution) is added to further insolubilize the product.

PREPARATION 11

*B. subtilis* neutral and alkaline proteases and amylase basic IBMA insoluble adduct

*B. subtilis* AM neutral and alkaline proteases and amylase mixture (250 mg.) is dissolved in 100 ml. cold 0.1 M in phosphate and 0.01 M in calcium acetate, pH 7.5, and to this solution is added a homogenized mixture of basic IBMA, Preparation 4 (200 mg.) suspended in 50 ml. cold 0.1 M phosphate, pH 7.5. The mixture is stirred overnight in the cold (4° C.) and the insoluble material is separated from the supernantant by centrifugation. After washing the solids five times with cold 0.1 M NaCl and twice with water, the material is lyophilized to yield a solid which possesses 35% of the original neutral protease activity, 42% of the original alkaline protease activity, and 58% of the original amylase acitivity. The amount of insoluble product produced is increased by employing 1–2% hexamethylenediamine, based upon the amount of IBMA employed, as crosslinker in the reaction.

The ratio of the activity of the alkaline protease to the activity of the neutral protease in the starting materials and in the basic polymer-enzyme products is preferably no greater than about 0.25 to 1.2 to one.

PREPARATION 12

Insoluble neutral protease/alkaline protease/ amylase/MPMA adduct

In another preparation and in a manner similar to that of Preparation 11, the foregoing enzyme mixture (used in Preparation 11) is attached to the basic 2-methyl-pentene-1/maleic anhydride copolymer product of Preparation 5, the product retaining approximately the same percentages of original enzymatic activities.

PREPARATION 13

Basic SMA/neutral protease

In another preparation and in the manner of Preparation 6, the basic SMA from Preparation 3 is attached to neutral protease, the basic polymer-enzyme product retaining approximately 45% of the original native protease activity.

EXAMPLE 1

Use of insoluble basic EMA-papain in beverage chillproofing (during fermentation)

One hundred barrels of wort is prepared using 60% malt and 40% corn grits. To the wort at 47° F. is added the brewer's yeast and this is allowed to ferment for twenty-four hours. At this time, 65.7 grams of an insoluble basic EMA-papain polymer (prepared as in Preparation 6) is added. This product has 320 tyrosine units per mg. as defined by the proteolytic assay of Weissler and Garza (Ann. Proc. Amer. Soc., Brew. Chemist 1965, pp. 225–238). After fermentation is complete (an additional 96 hours); the beer with the basic EMA-papain product suspended as a gel is decanted from the settled yeast, stored for seven days at 3° C., filtered, carbonated, stored for 4–5 additional days at low temperature, polished, filtered, bottled and pasteurized. The beer produced by this method has superior clarity, stability, and a decidedly improved taste as compared with beer made in the traditional manner by the addition of soluble papain in the cellar, essentially all enzymes having been removed therefrom by filtration removal of insolubles.

The basic EMA-papain is manually removed from the filter, washed with 1 liter of 0.1 NaOH, filtered, followed by two washes with 1 liter of 0.2 M acetic acid and two washes with 1 liter of water.

This washed, used polymer enzyme product is then put into another one hundred barrel batch of fermenting wort and treated as described above with the same results.

EXAMPLE 2

Use of insoluble basic EMA-papain in beverage chillproofing (in ruh stage with pasteurization)

To 9.3 kg. of filtered carbonated ruh beer in a five gallon stainless steel carbonated beverage can is added 52 mg. of a basic EMA-papain insoluble polymer (prepared as in Preparation 7) having after removal of Zn ions an activity of 285 Tyrosine u./mg. The can is sealed and mixed by tipping end to end several times. The $CO_2$ pressure is raised to ten pounds and the can then stored in a cooler at 0° C., for seven days with daily mixing. At this time the beer is pasteurized in the can at 60° C. for fifteen minutes and then immediately cooled. The beer is filtered through a 0.22µ Millipore filter, by which filtration the insoluble polymer enzyme product is removed, and then bottled and again pasteurized. Clarity, stability, and taste is superior to the traditional beer and the product maintains these favorable characteristics 6–12 months longer than conventionally chillproofed beer.

EXAMPLE 3

Use of insoluble basic EMA-papain in beverage chillproofing (ruh stage—cellar storage treatment)

To two hundred barrels of carbonated ruh beer in storage is added 132.8 grams of basic EMA-papain (as prepared in Preparation 7). A slow stream of $CO_2$ is allowed to enter at the bottom of the tank to allow some agitation of the polymer. This treatment persists for thirty days in the cellar. At this time, the beer is filtered (insoluble enzyme being removed in the process), bottled and pasteurized. The product is characterized by favorable and stable properties of clarity and taste.

EXAMPLE 4

Use of insoluble basic EMA-neutral protease and EMA-neutral protease/papain in beverage chillproofing (ruh stage—cellar storage treatment)

To two hundred barrels of carbonated ruh beer in storage is added 280 grams of EMA-neutral protease as prepared in Preparation 8. A slow stream of $CO_2$ is allowed to enter at the bottom of the tank to allow some agitation of the polymer. This treatment persists for thirty days in the cellar. At this time, the beer is filtered, bottled and pasteurized. Superior beer properties are achieved when compared to treatment with native neutral protease. This is attributable in part to a decrease of 1–2 pH units in the optimum-pH performance, bringing this neutral protease to an optimum pH more nearly coinciding with that of the natural pH of the beer (4–5).

When the treatments of Examples 1, 2, or 3 and 4 are combined, by using both basic EMA-papain and basic EMA-neutral protease together, the advantages of both are realized. The product is again an essentially enzyme-free beer characterized by favorable and advantageous stable properties of taste and remarkable clarity.

Alternatively, the insoluble basic EMA-neutral protease/papain product of Preparation 9 is substituted for the basic EMA-neutral protease in this beer clarification process to give exceptionally effective chillproofing.

EXAMPLE 5

Use of insoluble basic SMA-*B. subtilis* enzyme mixture in beverage chillproofing (storage beer—heat exchanger flow-through treatment)

Two hundred barrels of chilled storage beer is passed through a heat exchange column packed with three pounds of insolubilized basic SMA-*B. subtilis* enzyme mixture as prepared in either of the two preparations of Preparation 10. This column is maintained at 50° C. and at a flow rate of four gallons per minute. The effluent temperature is held at that of the influent by supplemental cooling oils. The beer is then filtered, bottled and pasteurized according to traditional methods. Clarity, stability, and taste of the beer is markedly improved and the bottled beverage has exceptional shelf life especially with regard to clarity and taste. Once again the product is an essentially enzyme-free beer which is characterized by favorable and advantageous stable properties of taste and exceptional clarity.

EXAMPLE 6

Use of insoluble basic IBMA-neutral protease/alkaline protease/amylase in beverage chillproofing The insoluble mixed-enzyme basic polymer product of Preparation 11 is packed in a column as described in Example 5 and the clarification process carried out substantially as described therein. A superior clarification is observed and is related to the multiple attack of the mixed enzyme preparation on the several components which normally make up the haze complex.

When the treatments of Examples 1, 2, or 3 and Example 6 are combined, by using both basic EMA-papain and the basic EMA-neutral and alkaline protease and amylase product together, the advantages of both are again realized. The product is once more an essentially enzyme-free beer characterized by favorable and advantageous stable properties of taste and remarkable clarity.

EXAMPLE 7

Use of insoluble chymopapain-basic vinyl methyl ether/maleic anhydride copolymers in beverage chillproofing Coupling of crystalline chymopapain to a basic alternating vinyl methyl ether-maleic anhydride (1:1) copolymer, prepared as in Preparation 5, in aqueous buffer medium using the conventional procedure of Preparation 6 at carrier to enzyme ratios of 1:3 to 5:1, yields insoluble basic polymer-chymopapain derivatives having up to about 40% of the original enzymatic activity.

Employment of mercury or zinc chymopapain, according to the procedure of Preparation 7, produces the same result with somewhat greater facility and a somewhat higher percentage of initial enzymatic activity in the basic polymer-chymopapain product.

This product is remarkably effective in clarifying beverages when employed as described in Examples 1–5.

EXAMPLE 8

Use of insoluble bromelain basic vinyl acetate/maleic anhydride copolymers in beverage chillproofing Coupling of bromelain to a basic alternating basic vinyl acetate-maleic anhydride (1:1) copolymer (prepared as in Preparation 1 or 2) in aqueous buffer medium using the conventional procedure of Preparation 6 at carrier to enzyme ratios of 1:3 to 5:1, yields insoluble basic polymer-bromelain derivatives having up to about 40% of the original enzymatic activity.

This product is remarkably effective in clarifying beverages when employed as described in Examples 1–5.

EXAMPLE 9

Use of insoluble papain-basic divinyl ether/maleic anhydride cyclocopolymers in beverage chillproofing Coupling of crude papain to a basic alternating divinyl ether-maleic anhydride cyclocopolymer (having repeating units consisting of adjacent ethylene-maleic anhydride segments which are additionally bonded to each other by an ether linkage, the basic derivative being prepared in the manner described in Preparation 1) in aqueous buffer medium using the conventional attachment procedure of Preparation 6 at carrier to enzyme ratios of 1:3 to 5:1, yields insoluble polymer-crude papain derivatives having up to about 45% of the original enzymatic activity.

Employment of mercury or zinc crude papain, according to the procedure of Preparation 7, produces the same result with somewhat greater facility and a somewhat higher percentage of initial enzymatic activity in the basic polymer-crude papain product.

This product is remarkably effective in clarifying beverages when employed as described in Examples 1–5.

EXAMPLE 10

Use of insoluble neutral protease-basic SMA and polymaleic anhydride polymers in beverage chillproofing Coupling of neutral protease isolated from *B. subtilis* strain AM to a basic polymaleic anhydride polymer (prepared in a manner similar to the process described in Preparation 1) in aqueous buffer medium using the conventional procedure of Preparation 6 at carrier to enzyme ratios of 1:3 to 5:1, yields insoluble basic polymer-neutral protease derivatives having up to about 60% of the original enzymatic activity.

This product, alone or in combination with one or more of the insoluble polymer-enzyme products of the foregoing and following examples and preparations, especially the products of Preparations 6, 7, 10 and 11, is effective in clarifying beverages when employed as described in Examples 1–5.

In the same manner, employment of the basic SMA-neutral protease product of Preparation 13 in the clarification of beer or ale, alone or in the combinations mentioned, gives a clear, colorful and tasteful beverage product, even upon long standing and after repeated warming and cooling.

EXAMPLE 11

Use of insoluble dextranase-basic polyacrylic anhydride and other polymers in beverage chillproofing Coupling of crystalline dextranase to a basic polyacrylic anhydride polymer (prepared in a manner similar to the process described in Preparation 1) in aqueous buffer medium using the conventional procedure of Preparation 6 at carrier to enzyme ratios of 1:3 to 5:1, yields insoluble basic polymer-dextranase derivatives having up to about 40% of the original enzymatic activity.

This product, alone or in combination with one or more of the insoluble polymer-enzyme products of the foregoing examples and preparations, especially the products of Preparations 6–12 and Examples 1–6, is remarkably effective in clarifying beverages when employed as described. The beverage product, in addition to being clear, stable, and tasteful, is of reduced caloric content.

In the same manner, identically useful enzyme-polymer products are produced from basic polymers of polyacrylic acid, e.g., dimethylaminopropylester of acrylic acid, using Woodward's reagent, N-ethyl-5-phenyl isooxazolium-3'-sulfonate, as activator for the carboxyl groups of the polymer.

EXAMPLE 12

Use of other insoluble polymer-enzyme products in beverage chillproofing

The following insoluble basic polymer-enzyme products, such polymers being prepared in accord with the procedure of the foregoing preparations (Preparations 1–5) and each possessing a substantial proportion of the enzymatic activity of the starting native enzyme from which prepared, with altered pH profile and enhanced substrate-binding capacity, are employed in the chillproofing of beverages according to the procedures of Examples 1–6 either alone or in combination with other polymer-enzyme products:

Dimethylaminopropylimide (70%) of EMA-neutral protease, alkaline protease, and diastase insoluble adducts;
*B. subtilis* neutral and alkaline protease-dimethylaminoethyl half-ester (50%) of EMA insoluble adducts;
*B. subtilis* neutral protease and amylase-dimethylaminopropyl amide-acid (80%) of EMA insoluble adducts;
*B. subtilis* neutral protease, papain and bromelain-diethylaminopropylimide (60%) of EMA insoluble adducts;
Neutral protease/chymopapain-diethylaminoethyl amide acid (40%) of styrene maleic anhydride copolymers;
Neutral protease/papain-diethylaminoethyl half - ester (70%) of vinyl methyl ether/maleic anhydride copolymers;
Neutral protease/alkaline protease/amylase-dimethylaminobutyl amide-acid (50%) of vinyl acetate maleic/anhydride copolymers;
Neutral protease/papain-dipropylaminoethyl half - ester (50%) of divinyl ether/maleic anhydride cyclocopolymers;
Neutral protease/bromelain-diethylaminopropyl half-ester (60%) of polymaleic anhydride polymers;
Papain-dimethylaminopropylimide (50%) of polymaleic anhydride polymers;
Neutral protease/alkaline protease/papain-diethylaminoethylimide (50%) of polyacrylic anhydride polymers;
Papain-dimethylaminoethyl half-ester (70%) of polyacrylic anhydride polymers;
Acid protease/papain-diethylaminohexylimide (50%) of EMA;
Papain/neutral protease/amylase - dimethylaminopropyl amide-acid (50%) of EMA;
*B. subtilis* neutral protease, papain and amylase-dimethylaminopropyl amide-acid (40%) of EMA insoluble adducts; and
Neutral protease/dextranase-diethylaminoethyl amide-acid (70%) of EMA insoluble adducts The results of the chillproofing treatment are similar to those obtained in Examples 1–6. The beverage is essentially enzyme-free, tasteful, and stable, with a remarkable clarity and brilliance even after chilling for long periods before opening for consumption either while chilled or after allowing to warm to room temperature.

In the manner of the chillproofing operations described in the preceding examples, other insoluble basic polymer-enzyme products including the amides, imides, esters and mixtures thereof, prepared as described using dilower-alkylamino-lower-alkylamines, monolower - alkylamino-lower-alkylamines, aminolower-alkylamines, dilower-alkylamino-lower-alkyl-alcohols, monolower - alkylamino-lower-alkyl-alcohols and amino - lower - alkylamino-alcohols, are used in the chillproofing of beverages. The beverage products are essentially enzyme-free, tasteful, and have superior clarity, oxidative stability, and chill-haze resistance.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

We claim:

1. Process for the chillproofing of a beverage with the production of a chillproofed beverage from which enzymatic activity used in the chillproofing has been removed, comprising the step of contacting the beverage at a stage in its production prior to final packaging with an insoluble enzymatically-active polymer-enzyme product in which the enzyme is covalently bound to a polymer containing basic or cationic groups, said insoluble enzymatically-active polymer-enzyme product being enzymatically active within the pH range of the beverage treated at the time of treatment, maintaining the insoluble enzymatically-active polymer-enyme product and beverage in contact for a sufficient period to allow the insoluble enzymatically-active polymer-enzyme product to act enzymatically upon commponents of the beverage which lead to sediment and haze in the beverage, and thereafter removing insoluble enzymatically-active polymer-enzyme product from the beverage wherein the chillproofing is effected using a polymer-enzyme product in which the polymer is selected from the group consisting of ethylene/maleic anhydride copolymers,
styrene/maleic anhydride copolymers,
vinyl methyl ether/maleic anhydride copolymers,
vinylacetate/maleic anhydride copolymers,
divinyl ether/maleic anhydride cyclocopolymers,
polymaleic anhydride polymers, and
polyacrylic anhydride polymers, the polymer in each case containing basic or cationic groups covalently bound in the molecule.

2. Process of claim 1, wherein the basic or cationic character of the polymer is due to presence therein of free amine, protonated amine, or quaternary ammonium moieties.

3. Process of claim 2, wherein said polymer-enzyme product comprises in the enzyme moiety thereof an enzyme which in its native state has a pH activity or optimum activity which is higher than the pH of the beverage being chillproofed.

4. Process of claim 2, wherein the insoluble enzymatically-active polymer-enzyme product is recovered and recycled in the process.

5. Process of claim 2, wherein removal of the insoluble enzymatically-active polymer-enzyme product from the beverage leaves the beverage essentially enzyme-free.

6. Process of claim 2, wherein the beverage treated is a malt beverage.

7. Process of claim 2, wherein the beverage treated is a fermented malt beverage.

8. Process of claim 2, wherein the beverage treated is beer or ale.

9. Process of claim 2, wherein the beverage treated is a fermented malt beverage and wherein the insoluble enzymatically-active polymer-enzyme product is added to the wort prior to completion of the fermentation stage.

10. Process of claim 2, wherein the beverage is a fermented malt beverage and wherein the insoluble enzymatically-active polymer-enzyme product is added to the ruh form of the beverage.

11. Process of claim 10, wherein the ruh form of the beverage to which the insoluble enzymatically-active polymer-enzyme product is added is heated to a temperature at which the insoluble enzymatically-active polymer-enzyme product is highly active.

12. Process of claim 2, wherein the beverage is passed over or through a column containing insoluble enzymatically-active polymer-enzyme product for purposes of effecting the reaction.

13. Process of claim 12, wherein the column containing the insoluble enzymatically-active polymer-enzyme product is maintained at a temperature at or near the temperature at which the polymer-enzyme product is optimally active.

14. Process of claim 12, wherein a portion of the main body of the cooled beverage is passed into a reaction zone within which the temperature is maintained at or near the temperature at which the polymer-enzyme product is optimally active, and wherein the beverage is thereafter returned to the main body of the beverage.

15. Process of claim 14, wherein the beverage returning to the main body of the beverage is cooled by a circulating portion of the cool main body of the beverage by means of a heat-exchange reaction.

16. Process of claim 2, wherein the chillproofing is effected using an insoluble polymer-plural enzyme product.

17. Process of claim 2, wherein the chillproofing is effected using a plurality of insoluble polymer-enzyme products.

18. Process of claim 2, wherein the chillproofing is effected using an insoluble polymer-papain product.

19. Process of claim 2, wherein the chillproofing is effected using an insoluble polymer-neutral or higher pH-acting acid protease product.

20. Process of claim 17, wherein the chillproofing is effected using insoluble polymer-neutral protease and polymer-papain products.

21. Process of claim 17, wherein the chillproofing is effected using both an insoluble polymer-enzyme product and an insoluble polymer-plural enzyme product.

22. Process of claim 21, wherein the plurality of enzymes in the polymer-plural enzyme product comprises neutral protease and amylase.

23. Process of claim 21, wherein the insoluble polymer-enzyme product is a polymer-papain product and wherein the plurality of enzymes in the polymer-plural enzyme product comprises neutral protease and amylase.

24. Process of claim 17, wherein the chillproofing is effected using polymer-papain and polymer-protease products.

25. Process of claim 16, wherein the chillproofing is effected using an insoluble polymer-papain/neutral protease product.

26. Process of claim 16, wherein the chillproofing is effected using an insoluble polymer-papain/higher pH-acting acid protease product.

27. Process of claim 16, wherein the chillproofing is effected using an insoluble polymer-papain/neutral protease/amylase product.

28. Process of claim 16, wherein the chillproofing is effected using an insoluble polymer-neutral protease/amylase product.

29. Process of claim 2, wherein residual reactive sites in the polymer moiety of the insoluble basic polymer-enzyme product comprise at least 30% basic or cationic groups.

30. Process of claim 29, wherein said basic or cationic groups comprise about 30% to about 100% of said residual reactive sites.

31. Process of claim 29, wherein said basic or cationic groups comprise about 40% to about 100% of said residual reactive sites.

32. Process of claim 2, wherein the polymer of the basic polymer-enzyme product employed is a cationic EMA-type polymer.

33. Process of claim 2, wherein the polymer of the polymer-enzyme product employed is a basic or cationic IBMA or EMA.

34. Process of claim 2, wherein the polymer contains a basic or cationic group selected from the group consisting of mono- and di-loweralkylaminoloweralkyl imide, amide, and ester groups.

35. Process of claim 30, wherein the enzyme moiety of the polymer-enzyme product employed comprises at least one enzyme selected from the group consisting of papain, neutral protease, a higher pH-acting acid protease, and ficin.

References Cited

UNITED STATES PATENTS

| | | | |
|---|---|---|---|
| 2,811,449 | 10/1957 | Witmer et al. | 99—48 |
| 3,095,358 | 6/1963 | Meister | 99—48X |
| 3,146,107 | 8/1964 | Elder et al. | 99—48X |
| 3,157,595 | 11/1964 | Johnson et al. | 210—54 |
| 3,282,702 | 11/1966 | Schreiner | 195—63X |

OTHER REFERENCES

Levin et al., A Water-Insoluble Polyanionic Derivative of Trypsin (I) Preparation and Properties, Biochemistry, vol. 3, No. 12, December 1964 (p. 1905), QP501B52.

LIONEL M. SHAPIRO, Primary Examiner

D. M. NAFF, Assistant Examiner

U.S. Cl. X.R.

99—105, 106